United States Patent [19]

Carter et al.

[11] Patent Number: 5,399,877
[45] Date of Patent: Mar. 21, 1995

[54] RADIATION SENSITIVE AREA DETECTION DEVICE AND METHOD

[75] Inventors: Daniel C. Carter; Diana L. Hecht; William K. Witherow, all of Huntsville, Ala.

[73] Assignee: The United States of America as represented by the Administrator of the National Aeronautice and Space Administration, Washington, D.C.

[21] Appl. No.: 243,602

[22] Filed: May 6, 1994

Related U.S. Application Data

[63] Continuation-in-part of Ser. No. 710,193, Jun. 3, 1991, abandoned, and a continuation-in-part of Ser. No. 964,480, Oct. 21, 1992, abandoned.

[51] Int. Cl.[6] .............................................. G03B 42/02
[52] U.S. Cl. ..................................... 250/581; 250/584; 250/585; 250/586; 250/228; 356/236
[58] Field of Search .................. 250/327.2, 484.1, 228, 250/458.1, 337, 327.2 D, 327.2 E, 327.2 F, 327.2 A, 581, 584, 585, 586, 580; 356/236

[56] References Cited

U.S. PATENT DOCUMENTS

| | | | |
|---|---|---|---|
| 4,517,463 | 5/1985 | Gasiot et al. | 250/327.2 |
| 4,814,616 | 3/1989 | Saotome | 250/484.1 X |
| 4,816,679 | 3/1989 | Sunagawa et al. | 250/484.1 X |
| 4,835,386 | 5/1989 | Shimura et al. | 250/484.1 X |
| 4,864,134 | 9/1989 | Hosoi et al. | 250/327.2 F |
| 4,908,520 | 3/1990 | Saotone et al. | 250/484.1 X |
| 4,922,102 | 5/1990 | Katayama | 250/585 |
| 4,922,103 | 5/1990 | Kawatiri et al. | 250/484.1 X |
| 4,933,558 | 6/1990 | Carter et al. | 250/327.2 |
| 4,999,504 | 3/1991 | Braunlich et al. | 250/337 |
| 5,012,095 | 4/1991 | Horikawa et al. | 250/327.2 K |
| 5,068,739 | 11/1991 | Fico | 356/236 X |
| 5,241,459 | 8/1993 | Kaplan et al. | 250/228 X |

FOREIGN PATENT DOCUMENTS

| | | | |
|---|---|---|---|
| 60-93425 | 5/1985 | Japan | 250/585 |
| 3-80240 | 4/1991 | Japan | 250/585 |

Primary Examiner—Constantine Hannaher
Assistant Examiner—Edward J. Glick
Attorney, Agent, or Firm—Robert L. Broad, Jr.; Guy M. Miller; Alan Kennedy

[57] ABSTRACT

An area detection device for use with X-ray or ultraviolet radiation wherein light from an integrating device is passed through an optical fiber to fall on a phosphor-containing film which is capable of storing a diffraction pattern formed by the transmission of X-rays or ultraviolet radiation through a sample when the diffraction pattern is projected onto the film and also being capable of fluorescing in correspondence to the diffraction pattern. Fluoresced light from the film is directed back along the fiber and into the integrating device and is fed from the integrating device to a photomultiplier which sends a signal from which the diffraction pattern can be detected.

31 Claims, 3 Drawing Sheets

RADIATION SENSITIVE AREA DETECTION DEVICE AND METHOD

This application is a continuation in part application of application Ser. No. 07/710,193, filed Jun. 3, 1991 in the names of Daniel C. Carter, William K. Witherow and Diana L. Hecht for "Radiation Sensitive Area Detection Device and Method", now abandoned, and application Ser. No. 07/964,480, filed Oct. 21, 1992 in the names of Daniel C. Carter, William K. Witherow and Diana L. Hecht for "Radiation Sensitive Area Detection Device and Method", now abandoned.

ORIGIN OF THE INVENTION

The invention described herein was made by employees of the United States Government and may be manufactured and used by or for the government for governmental purposes without the payment of any royalties thereon or therefor.

FIELD OF THE INVENTION

The invention relates to radiation-sensitive area detection devices for use in conjunction with X-ray and ultraviolet radiation sources.

BACKGROUND OF THE INVENTION

Radiation area detector systems have become a valuable tool for experimentation and research in a wide variety of scientific and medical applications. Over the past few years, these detectors have become increasingly important as analytical and diagnostic devices which are used in such diverse fields as crystallography, medical radiography, electron microscopy, biophysics, and even astronomy. Previously, these area detection devices generally fell into either of two distinct types: (1) the multi-wire proportional counter, such as described in Bateman et al, *Nuc. Inst. Meth. Res.* A259: 506–520 (1987), and (2) the T.V. detector such as disclosed in Kalata, *Methods in Enzymology* 114: 486–510 (1985). These two types of area detection devices are still used today in various applications.

These previous devices, however, have suffered from several drawbacks. In particular, they are often extremely limited in terms of active area and spatial resolution, and often experience high levels of spatial distortion and non-uniformity of response. The devices also generally require a prolonged exposure to X-rays in order to develop a satisfactory picture. In cases where an instantaneous image of a rapidly deteriorating sample is required, these prior systems have not been rapid enough to provide near real time images, and thus are not suitable for such an application.

In the field of protein crystallography, instantaneous imaging is almost always necessary and a device that can provide near real time images is often required. During crystal growth, protein single crystals are grown so that the three-dimensional structure of the protein can then be determined by X-ray or other radiation diffraction patterns. Typically, these grown crystals deteriorate very rapidly with increasing time and handling, and the specific details of the protein structure will often be lost if an X-ray pattern from the crystals cannot be obtained within an extremely short period after their formation. It is thus extremely important to develop systems for area detection which have rapid data acquisition and which can provide near real time imaging capabilities for X-ray diffraction patterns.

A relatively recent discovery of the unique properties of certain phosphor-containing films has enabled new developments in X-ray and ultraviolet-sensitive area detection devices. In particular, it has been found that a plate containing a barium fluorohalide (such as BaFX:Eu) crystal will absorb a particular fraction of incident X-ray or UV radiation by "trapping" an electron in a halogen ion vacancy or "F-center". Electrons so trapped will normally be stored at a half life of approximately 10 hours. However, if the film containing the trapped electrons is irradiated with visible light, the electrons in the F-center will be liberated to the conduction band which leads to the formation of $Eu^{+2}$ ions in an excited state. These excited ions then relax to give off luminescence in proportion to the intensity of the X-ray or UV radiation originally absorbed by the film. It is thus possible through the use of such film to create a stored or latent image on the film which can almost instantaneously be dumped or otherwise transmitted to an image translation means by subsequent illumination of the film by an appropriate wavelength of light or other electromagnetic wave. Further, after the dumping of the image, the phosphor film will return to its original state so as to be reusable for further X-ray imaging.

Devices incorporating such a phosphor-containing film are also known in the art. An example of one is found in Miyahara et al, *Nuc. Inst. Meth. Phys. Res.* A246: 572–578 (1986), and this device essentially consists of a barium fluorohalide phosphor screen imaging plate, a laser beam reflected by a scanning mirror, a light guide for collection of the photostimulated luminescent radiation, and a tube for collecting the fluoresced light. In this device, a He—Ne laser beam emitting light at about 633 nanometers is reflected by the mirror and used to illuminate the film which luminesces at around 400 nm in response to the laser stimulation.

Another area detection device is also disclosed in U.S. Pat. No. 4,933,558 (Carter et al), incorporated herein by reference, wherein a light source either directly or through a mirror illuminates the phosphor-containing film storing the X-ray image, and the fluoresced light is focused upon a charged coupled detecting element by means of a lens or an optical fiber bundle in the shape of a half-hour glass. Both of these devices can be used to scan the film line-by-line, but are limited in that the pixel rsesolution obtained in the line scan cannot be easily changed.

There are still other problems with prior art side-by-side scanning devices which have restricted their effectiveness. One such problem is that they tend to create skewed-shaped pixels on the outer edges, and there often are problems relating to spontaneous fluorescence which contributes to unwanted background noise. In addition, it is prefered that the means to illuminate the phosphor-containing film be physically as close to the film as possible, yet this is hard to accomplish using any of these prior devices. It is also desirable to accomplish injection and detection of the excitation and fluoresced radiation along the same optical path in order to maximize the efficient transmission of light and ensure a high spatial resolution in the scanning device.

It is thus a desirable object to develop an X-ray and UV or radiation sensitive area device of high spatial resolution that can utilize a phosphor-containing film in a manner which allows for line-by-line scanning with easy manipulation of pixel resolution, injection and detection of excitation and fluorescence using the same optical pathway, and the placement of the illuminating light source as physically close to the phosphor film as possible. A device utilizing these features can be used successfully to produce near real time images of high spatial resolution from rapidly deteriorating samples such as would be involved in research in the field of protein crystallography.

SUMMARY OF THE INVENTION

In accordance with the present invention, a radiation sensitive area detection device for use in conjunction with X-ray, UV, or other radiation source is provided which comprises:

(a) a phosphor-containing film capable of receiving and storing an image formed by the pattern of incoming radiation falling on the film after deflection or transmission through a sample, and capable of fluorescing this pattern in response to stimulation from light or other electromagnetic wave;

(b) a light integrating device;

(c) a light source positioned to project light or other electromagnetic wave into the integrating device;

(d) an optical fiber having one end positioned directly in front of the phosphor-containing film and the other end connected to the integrating device, said fiber being capable of directing a variable amount of light or other electromagnetic wave entering the integrating device from the light source onto the phosphor-containing film so that said film fluoresces in proportion to the stored image and the fluoresced light travels back along said fiber to the integrating device; and (e) a signal processing means connected to the integrating device and comprising a light receiving means capable of receiving the fluoresced light from said integrating sphere and transmitting a signal corresponding to the amount of fluoresced light from the phosphor-containing film to a signal translation means, the signal translating means being capable of translating the signal received from said light-receiving means to allow detection of the pattern formed on the phosphor-containing film as a result of incoming radiation falling on said film after deflection or transmission through a sample.

The one end of the optical fiber is preferably held directly in front of the phosphor-containing film by means of a spring-loaded thin metal holder that can be moved horizontally or vertically across the phosphor-containing film by motor driven stages. Additionally, it is preferred that the holder contain a pinhole through which light passing through the optical fiber can be varied before being directed onto the phosphor film. It is preferred that a photomultiplier tube be employed as the light-receiving means of the invention. The detection device of the present invention is preferably retained in a light-proof, compact housing which will ensure a high efficiency and superior spatial resolution. A method is also provided for obtaining a near real time image of an X-ray or ultraviolet diffraction pattern of a sample utilizing this device.

DETAILED DESCRIPTION OF THE INVENTION

Figure 1:
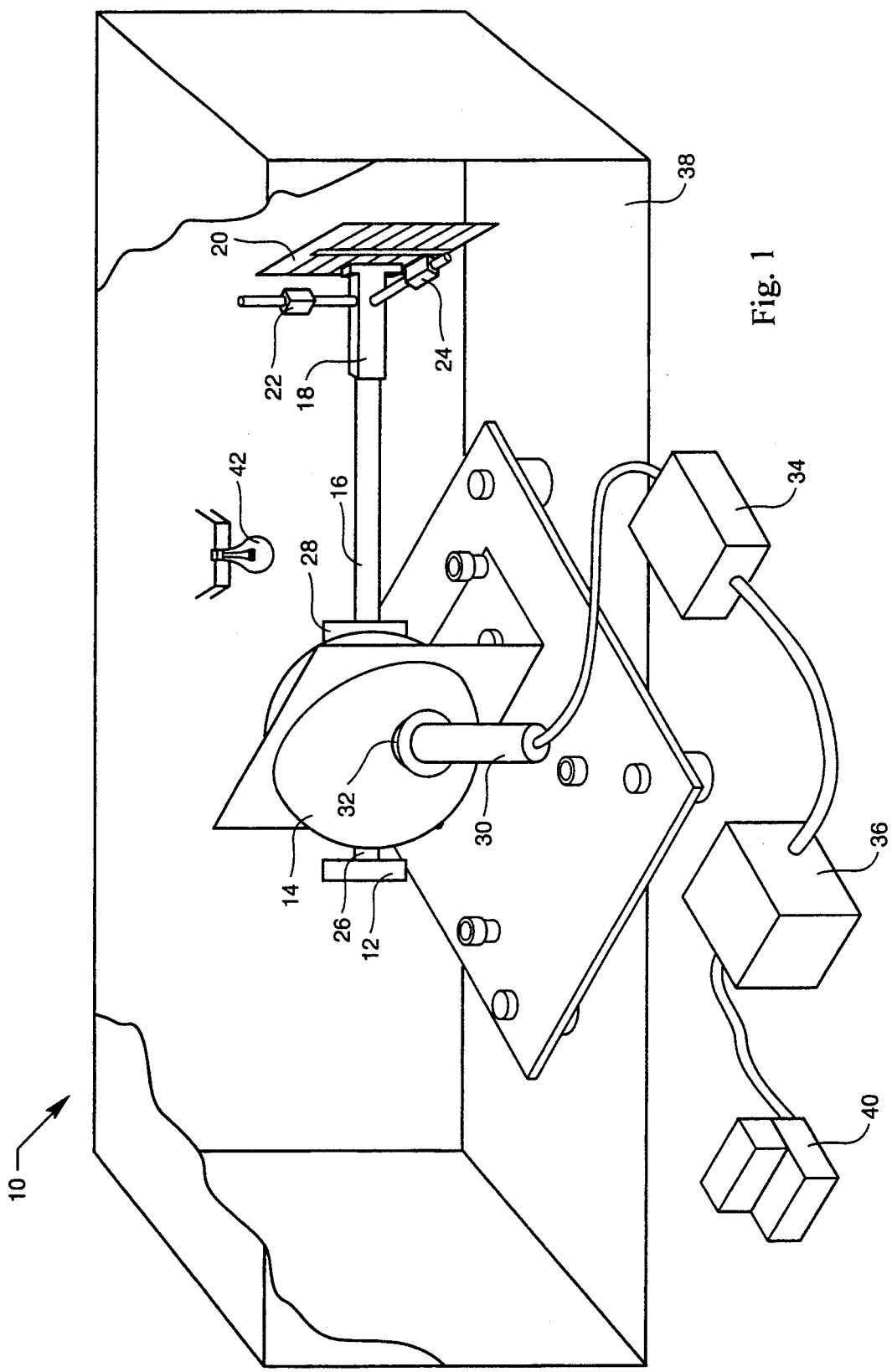
FIG. 1 is a perspective schematic view of an area detector in accordance with the present invention showing the various parts of the apparatus.

According to the present invention, a radiation-sensitive area detection device for use in conjunction with an X-ray or ultraviolet or radiation source is provided, such as can be seen in FIG. 1. The device 10 primarily consists of a light source such as a helium-neon laser 12 which directs light into a light integrating device such as an integrating sphere 14. An optical fiber 16 directs light from the integrating sphere onto the phosphor-containing film or imaging plate 20, one end (the first end) of the fiber being positioned directly in front of the film 20 and the other end (the second end) being connected to the integrating sphere.

By moving the one or first end of the optical fiber across the phosphor film 20 as light from the light source 12 is impinged on the film, a complete pattern of the image stored in the film can be obtained.

In order to move the one or first end of the optical fiber 16 vertically and horizontally across the phosphor-containing imaging plate 20, means are provided such as servo-motor driven stages 22 and 24 which are connected to a fiber-optic holder 18 preferably made of a suitable highly polished thin metal, polytetrafluoroethylene or other suitable material. The highly polished metal holder is preferred because it can be machined much thinner than the polytetrafluoroethylene. The vertical servo-motor driven stage 22 is provided to move the first end of the optical fiber up and down vertically across the phosphor plate 20 and the horizontal stage 24 is provided to move the fiber-optic holder 18 across the plate 20 horizontally. If so desired, stepping motors can be used in place of the servo-motors.

In the preferred embodiment, both horizontal (or X-axis) stage 24 and the vertical (or Y-axis) stage 22 have 250 mm travel capacity, at least 100 micron resolution, and are configured with incremental encoders and origin switches located at the motor end. By having both stages motored by DC servo motors, one is able to use a controller with faster translation speeds and better control over specific parameters such as the PID (Proportional, Integral, Derivative) filters. Suitable for use as the horizontal or vertical stage is the MT 160.250 (354062) stage from Klinger Scientific Corporation. Ideally, both motors can be controlled using a controller such as the DCS 750 motor controller/driver. The stages can be mounted by means of a mounting bracket such as the EQ 160 mounting bracket produced by Klinger Scientific Corporation.

If desired, one or both axis stages can also be powered by stepping motors to allow stepwise scanning across the phosphor plate 20. In such a configuration, a stepping motor-driven stage (not shown) such as the MT 160.200 (354085) stage available from the Klinger Scientific Corporation can be used in conjunction with a stepping motor such as a VE 73PP series stepping motor.

It is preferred that the translations stage 24 used for the X-axis be equipped with a 2000 point shaft encoder, with each encoder pulse corresponding to about 10 microns. This configuration will allow the resolution to be adjusted in 10 micron steps. If the circuit is set to latch the count every 10 pulses, then the resolution will be 100 microns. Accordingly, if the circuit is set to latch the count every 5 pulses, the resolution will be 50 microns. It is also preferred that the translation stage 22 used for the Y-axis be equipped with a 200 point shaft encoder, with each encoder pulse corresponding to about 100 microns. This configuration will allow for enhanced speed capability for the scanning process.

In the preferred embodiment, the integrating sphere 14 has portholes 26 and 28. Light from the light source 12, which is mounted on the integrating sphere 14, is passed into the integrating sphere through the porthole 26 and then from the integrating sphere onto the phosphor plate 20 via the porthole 28 and the optical fiber 16. After the phosphor film is stimulated to fluoresce by light from the light source, the fluoresced light from the film travels back through the fiber 16 and into the integrating sphere through the porthole 28.

The integrating sphere preferably has an inner surface that reflects at least about 95% and preferably about 98% of the incoming light. The inner surface of the integrating sphere can be coated with a known highly reflective paint having a reflection preferably in the 400 nm range. This will ensure proper reflectivity from the integrating sphere to a light receiving means. Suitable for use as an integrating sphere is the Model No.: 27-5560-01 available from Ealing Electro-optics, Inc.

Connected to the integrating sphere is a light receiving means, preferably a photomultiplier tube 30, which is connected to the integrating sphere via a porthole 32. Other suitable light receiving means such as that disclosed in U.S. Pat. No. 4,933,558 can also be used. In the preferred embodiment, the photomultiplier tube 30 will have a peak wavelength and high quantum efficiency at around 400 nanometers so as to best detect the fluoresced light from the integrating sphere. After receiving the fluoresced light from the integrating sphere, the photomultiplier tube 30 will transmit a signal corresponding to the amount of fluoresced light received from the phosphor film 20 to a signal translation means.

The signal processing means of the invention includes a light receiving means such as the tube 30 and a signal translation means which is employed to detect the pattern originally formed on the phosphor film as a result of incoming radiation falling on the film after deflection or transmission through a sample. In the preferred embodiment, the photomultiplier tube 30 transmits a pulsed signal in proportion to the fluoresced light that is transmitted by the phosphor film following stimulation by the light source 12. This pulsed signal is transmitted to the signal translation means which in the preferred setup comprises a pulse preamplifier discriminator 34 that receives the pulses from the photomultiplier tube 30 and outputs a signal that can be counted. Suitable for the discriminator is the F-100 T model available from Modern Instrumentation Technology, Inc. which outputs TTL signals in response to the photomultiplier pulses. Additionally, the signal translation means comprises a counting circuit 36 which receives signals from the discriminator 34. This counting circuit preferably uses encoder pulses from the motor driven stages 22 and 24 in order to determine the location of a particular data point and to provide for various step sizes depending on the desired resolution (generally about 50 to 100 microns). The counting circuit 36 also counts the light pulses at each step and sends the count to a computer 40, the final element of the signal translation means, for storage, image generation, or further numerical analysis.

The device 10 will also preferably include an outer light-proof housing 38 so as to eliminate undesirable background light and maximize the efficiency of the detection device. It is also preferred that a secondary light source 42 be provided which is capable of completely releasing any remaining radiation in the phosphor film after the main scanning is finished.

The phosphor film 20 of the present invention will be one that can absorb incoming radiation so as to retain a latent image of a diffraction pattern formed after radiation, such as by X-rays or ultraviolet rays, are transmitted or deflected by a sample such as a protein crystal. It is preferred that films containing barium fluorohalide crystals be used as the phosphor film in the present invention. Most preferred are films or plates containing a $BaFBr:Eu^{+2}$ photostimulable phosphor, which have been most successful when used in the present device. Other barium fluorohalide crystals such as BaFCl have also been suitably used as phosphors in the plate 20. Any other film that fluoresces in proportion to the stored radiation in response to stimulation by light may also be used in the invention.

In the preferred method of the invention, a radiation diffraction image pattern is first stored in the phosphor film, such as in the manner described previously in U.S. Pat. No. 4,933,558, before light from the light source 12 is directed onto the phosphor film 20 to cause it to fluoresce and release this pattern. In this scheme, radiation such as X-rays or ultraviolet light is directed to pass through a sample container such as a capillary tube which contains a crystal or other object to be studied. The container is generally situated on a goniometer (or crystal positioner) which can ensure a 360° rotation of the chamber and produce a radiation diffraction pattern from the crystal onto the phosphor-containing film 20. The diffraction pattern will be stored in the phosphor film until the image is released by light stimulation causing the phosphor to fluoresce.

When "dumping" or translation of the latent image stored by the phosphor film is desired, it is necessary to illuminate the film with a suitable source of light or other appropriate electromagnetic wave. When the light source is an He—Ne laser, light directed at the phosphor screen from the laser will cause the phosphor film to fluoresce at a wavelength of approximately 400 nanometers and the latent image will be released or removed from the film. As the film fluoresces, the fluorescing light is carried by the fiber 16 back to the integrating sphere 14 where it is reflected into the photomultiplier tube. In other words, the illuminating light from the laser (via the integrating sphere) is traveling down the the fiber to illuminate and fluoresce the film while the fluoresced light from the film is traveling through the fiber in the opposite direction to the integrating sphere.

Preferably, the photomultiplier tube is protected from the original 633 nanometer light from the laser by a bandpass filter which prevents the 633 nanometer light from passing into the photomultiplier tube. The inner reflective coating of the integrating sphere as well as its shape minimizes the amount of light lost from the fluoresced light traveling along the optical fiber before being collected by the photomultiplier.

The optical fiber 16 that is used in this invention thus must be capable of transmitting the beam from the light source such as the He—Ne laser 12 onto the phosphor screen 20 and at the same time channel fluoresced light from the screen back to the integrating sphere where it will be collected by the photomultiplier tube 30. It is preferred that a high numerical aperture optical fiber comprised of silica (preferably in pure form) and capable of transmitting wavelengths from about 390 to 650 nm be employed in the present invention. Another suitable optical fiber is the HCS HCN/H optical fiber produced by the Ensign-Bickford Optics Company. This type of fiber will allow the approximately 633 nm wavelength transmitted by the He—Ne laser light source to impinge upon the phosphor film 20 so to cause fluorescence, while at the same time act to transmit the fluoresced light from the phosphor film which will be at a wavelength of about 400 nm.

Figure 2:
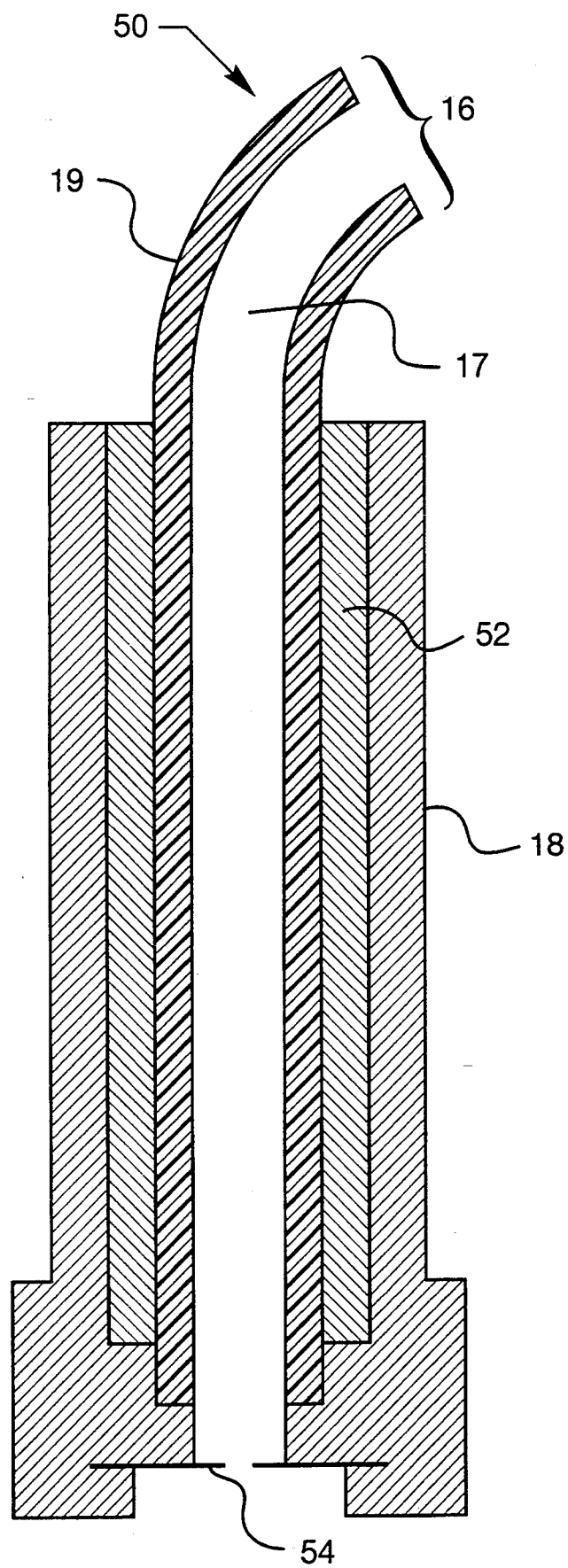
FIG. 2 is an enlarged cross sectional view of an optical fiber used in accordance with the device of this invention.

It is important for the first end of the optical fiber 16 to be placed directly in front of the phosphor screen 20 and to be moved across the screen in such a manner as to obtain a high resolution pattern of the image formed on the screen with a minimum of distortion. Accordingly, it is preferred that a spring-loaded holder 18 be used with the fiber-optic system on the present invention. This holder is preferably constructed out of a highly polished thin metal or polytetrafluoroethylene so that it can be moved across the screen without causing any damage. A number of suitable metals can be used to construct the holder, as will be apparent to one skilled in the art. It is also possible that this holder can be comprised of a thin light-weight metal or other material which has been coated with polytetrafluoroethylene. The holder 18 in conjunction with a fiber optic assembly is best shown in FIG. 2. The fiber-optic assembly 50 is comprised of an optical fiber 16 which is made up of a central core region 17 (normally about 300 microns) and an outer cladding 19 made of a high NA bonded hard polymer or other suitable material.

The first end of the fiber 16 is thus constrained by means of the optical fiber holder 18. As shown in FIG. 2, the holder is characterized by a fiber optic chuck 52 which is centrally located in the holder and which retains the first end of the the fiber 16 in place. At the first end of the fiber 16, directly in front of the phosphor screen 20, there is a pinhole 54 which determines the resolution of the beam of incoming light. The pinhole 54 is preferably removable so that a variety of differently-sized pinholes, such as 50 microns, 100 microns, etc., can be used, depending on the particular resolution that is sought. This replaceable pinhole 54 allows quick adjustment of resolution so that the device of the present invention can readily be converted for a variety of different scannings. In the preferred embodiment, the device employs a pinhole in a filter which passes only 400 nm light. In this configuration, the laser beam is passed through the central pinhole (at about 50 or 100 microns in diameter) and the fluoresced light from the film is received over the entire face of the filter.

In the preferred method of carrying out the present invention, a diffraction image is stored on the phosphor film 20 as a sample is impinged by X-rays or ultraviolet radiation as described above. While the original diffraction image is being formed on the phosphor film 20, the fiber-optic holder and the translation stages are moved to one side so as to not interfere with the projection of the diffraction image onto the film. After the image has been stored by the phosphor-containing film 20, the scanning to reveal that image can be done.

In the preferred embodiment, a beam of He—Ne laser light from the light source 12 is used to cause the phosphor screen 20 to fluoresce with a luminance in proportion to the amount of light or X-ray stored at each location. The light from the laser 12 is directed through the porthole 26 into the integrating sphere 14 and is then directed through the fiber 16 onto the phosphor film 20 by means of the fiber optic holder 18. The phosphor screen 20 will luminesce in response to the laser light and this light is collected using the same optical fiber assembly that carries the laser light. The high numerical aperture of the fiber and the positioning of the fiber directly in front of the phosphor film 20 ensure that the maximum number of photons from the screen are received. The desired resolution can be obtained by choosing a pinhole having a particular size which will be controlled by the holder 18. Preferably, a 100 micron resolution pinhole will be employed which will be suitable for many applications, but if necessary, this resolution can be changed by using a pinhole having a different diameter, e.g., about 50 microns.

The scanning of the image is accomplished by moving the fiber-optic holder 18 by means of the motor driven stages 22 and 24. The stages are used to position the fiber-optic holder 18 which holds and moves the first end of the optical fiber which transmits the laser light in one direction and the fluoresced light in the other. When scanning is about to be accomplished, the holder 18 is preferably positioned at the lower left-hand corner of the film. The translation of the image is preferably accomplished by moving the fiber-optic holder 18 from the lower edge to the upper edge of the film, then moving it horizontally one unit or step to the side, followed by moving the vertical stage back to the lower edge of the screen, stepping another horizontal step to the side, and repeating these steps until the film has been completely scanned by the fiber-optic holder 18. The upward and downward movement of the fiber-optic holder 18 accomplishes scanning without the prior art problems which accompanied previous side-to-side scanners. In those prior art devices, side-to-side scanning created skewed-shaped pixels on the outer edges. As a further advantage of the present device, the particular scanning system of the invention eliminates any spontaneous fluorescence from other regions of the phosphor which previously would have contributed to unwanted background noise.

In the present method, the fluoresced light is carried back through the optical fiber 16 to the integrating sphere 14 through the porthole 28, where it is reflected onto the photomultiplier tube 30 connected at the side of the sphere 14. In the preferred embodiment, the photomultiplier pulses in response to the incoming light, and the output signal is then sent through a pre-amplified discriminator 34 and a counter circuit 36. The photon count from the photomultiplier which is sent to the discriminator is converted into TTL-level pulses. The pulses are sent from the discriminator to the counter circuit 36 which counts the signals and then sends the number to a computer 40 via a parallel input/output board where the signals can be translated, stored, or processed further.

The circuit which is used to count the light pulses received from the photomultiplier tube 30 and the amplifier system is also preferably used to count encoder pulses from the shaft encoder mounted along with the vertical DC servo-motor driven stage 22. In this configuration, the vertical stage is driven by a faster servo-motor rather than a stepwise motor, which reduces the total time needed for the scan. The encoder pulses received from the motor driven stages can be used to establish the exact position of the holder 18 when the light pulses received from the phosphor-containing film are counted. In a preferred mode, each pulse of the encoder from the vertical stage corresponds to about 100 microns, and to about 10 microns per pulse from the horizontal stage, but the resolution can be changed easily by changing the number of encoder pulses counted before the light-pulse count is latched and sent to the computer.

After the scan is completed, the fiber-optic holder 18 can again be moved to the side to allow a second diffraction pattern to be stored by the phosphor-containing film. It is preferred that before a second image is projected onto the phosphor film, all remaining light stored in the film be released by flashing a bright light 42 which is mounted inside the housing 38 which surrounds the scanning apparatus. In this manner, the film can be completely cleaned of the original image and be ready to store another image. When a second diffraction image is stored in the film, the entire translation process can be repeated as indicated above. In this manner, a near real time image of high spatial resolution can be obtained without the distortions or problems in prior art systems employing photomultiplier tubes.

Figure 3:
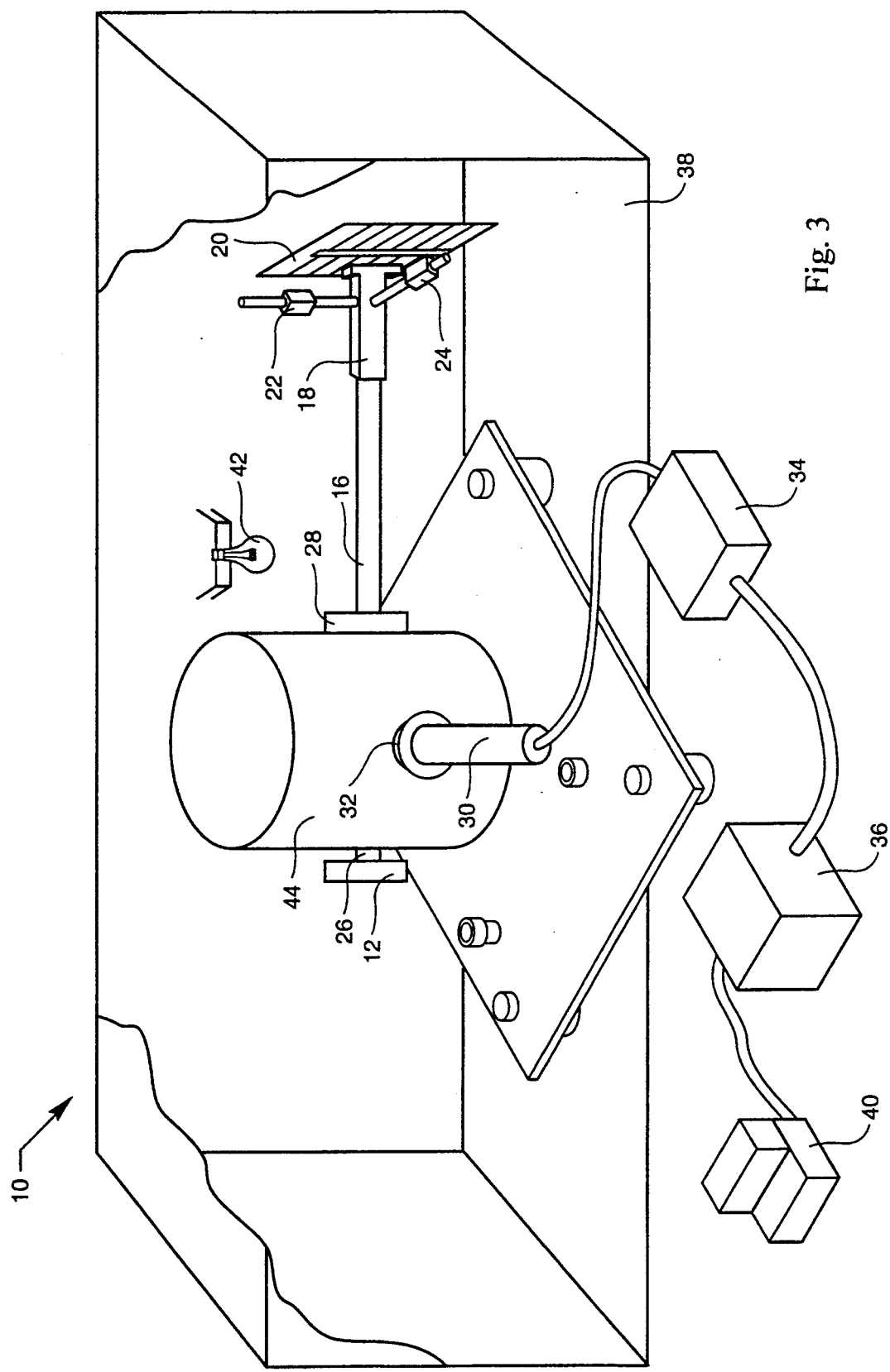
FIG. 3 is a perspective schematic view of the area detector of FIG. 1 with an integrating cylinder substituted for the integrating sphere of FIG. 1.

Other features and advantages inherent in the above-disclosed system will be obvious to those skilled in the art, and it is clear that a variety of alternate embodiments can be employed without departing from the scope of the present invention. For example, it is possible that instead of the integrating sphere 14, an integrating cylinder 44 (FIG. 3) can be used. It is also possible to use the detecting assembly of the present invention in a drum or disc scanner configurations. As a further embodiment of the invention, it is sometimes desirable to cool the imaging plate by using a suitable thermoelectric device, which can further reduce the problem of spontaneous fluorescence and thereby increase the efficiency of the scanning of the phosphor-containing film.

What is claimed is:

1. A radiation sensitive area detection device for use in conjunction with an X-ray or ultraviolet radiation source, comprising:
   (a) a phosphor-containing film capable of receiving and storing an image formed by a pattern of incoming radiation falling on the film after deflection or transmission through a sample, and said film being capable of fluorescing to produce fluoresced light in response to stimulation from light;
   (b) a light integrating device;
   (c) a light source positioned to project light into the integrating device;
   (d) an optical fiber having one end positioned directly in front of the phosphor-containing film and the other end connected to the light integrating device, said fiber being capable of directing light entering the integrating device from the light source onto the phosphor-containing film so that said film fluoresces in proportion to the stored image, with said fluoresced light traveling back along the fiber to the integrating device;
   (e) light receiving means connected to the light integrating device for receiving fluoresced light from the integrating device and transmitting a signal corresponding to the amount of fluoresced light; and
   (f) signal translating means connected to the light receiving means for translating said transmitted signal to allow detection of the image stored in the phosphor-containing film.

2. The area detection device of claim 1 wherein the light source is a laser.

3. The area detection device of claim 1 wherein the light source is a He—Ne laser.

4. The area detection device of claim 1 wherein the optical fiber is capable of transmitting wavelengths in the range of 390 to 650 nanometers.

5. The area detection device of claim 1 wherein the fiber is comprised of silica.

6. The area detection device of claim 1 wherein the phosphor-containing film comprises a barium fluorohalide phosphor.

7. The area detection device of claim 1 wherein the barium fluorohalide phosphor is selected from the group consisting of $BaFBr: Eu^{2+}$ and $BaFCl$.

8. The area detection device of claim 1 wherein the phosphor-containing film fluoresces light at a wavelength of about 560 nanometers.

9. The area detection device of claim 1 wherein the phosphor-containing film fluoresces light at a wavelength of about 400 nanometers.

10. The area detection device of claim 1 wherein the light receiving means is a photomultiplier.

11. The area detection device of claim 1 wherein the light receiving means is a photomultiplier having a peak wavelength at about 400 nanometers.

12. The area detection device of claim 1 wherein integrating device has an inner coating of a reflecting paint that reflects at least about 95% of incoming light.

13. The area detection device of claim 1 wherein the signal translation means comprises a discriminator capable of receiving a signal from the light-receiving means and transmitting the signal to a computer, said computer being capable of receiving the signal from the discriminator and translating the signal so as to allow detection of the image stored in the phosphor-containing film.

14. The area detection device of claim 1 further comprising a light-proof housing.

15. The area detection device of claim 1 further comprising a secondary light source capable of illuminating the phosphor-containing film to erase the stored image.

16. The area detection device of claim 1 wherein the photomultiplier is capable of transmitting a pulsed signal in proportion to the fluoresced light emitted by said phosphor-containing film.

17. The area detection device of claim 16 wherein the signal translation means comprises a pulse discriminator that is capable of receiving a pulsed signal from the photomultiplier, a counting circuit which is capable of counting the pulsed signals received by the pulse discriminator and sending the count to a computer, said computer being capable of receiving the count from said counting circuit so as to allow detection of the stored image.

18. The area detection device of claim 17 wherein the computer is capable of generating the stored image, snoring said image and performing further numerical analysis on said image after receiving the count from said counting circuit.

19. The area detection device of claim 1 wherein said one end of the fiber is held in a spring-loaded holder capable of moving said one end of the fiber across the phosphor-containing film.

20. The area detection device of claim 19 wherein the holder contains a pinhole through which the light passing through the optical fiber is directed onto the phosphor-containing film.

21. The area detection device of claim 20 wherein the holder is made of polytetrafluoroethylene.

22. The area detection device of claim 20 wherein the holder is made from a polished metal.

23. The area detection device of claim 20 wherein the holder is made of metal coated with polytytetrafluoroethylene.

24. The area detection device of claim 20 wherein said holder is moveable horizontally and vertically across the phosphor-containing film.

25. The area detection device of claim 20 wherein the holder is moved across the phosphor-containing film by means of a servo motor-driven stage.

26. The area detection device of claim 20 wherein said holder is moved by means of a stepping motor-driven stage.

27. A radiation-sensitive area detection device for use in conjunction with an X-ray or ultraviolet radiation source, comprising
(a) a phosphor-containing film capable of receiving and storing an image formed by a of incoming radiation falling on the film after deflection or transmission through a sample, said film also being capable of fluorescing in response to stimulation from light, said fluorescence being directly proportional to the stored image;
(b) an integrating cylinder;
(c) a light source positioned to project light into the integrating cylinder;
(d) an optical fiber having one end positioned in front of the film and the other end connected to the integrating cylinder, said optical fiber being capable of directing light from the integrating cylinder onto the phosphor-containing film to cause said film to fluoresce in proportion to the stored image and also being capable or directing the fluoresced light back along the fiber to the integrating cylinder; and
(e) signal processing mean comprising a light receiving means capable of receiving the fluoresced light from the integrating cylinder and transmitting a signal corresponding to the amount of fluoresced light from the phosphor-containing film to allow detection of the stored image.

28. A method of obtaining an image of the diffraction pattern caused by the deflection or transmission of X-ray or ultraviolet radiation through a sample, comprising the steps of
(a) directing X-ray or ultraviolet radiation through a sample so that a radiation diffraction pattern from the sample falls upon a phosphor-containing film capable of retaining the image of the diffraction pattern and fluorescing light corresponding to that pattern in response to stimulation by light; and
(b) illuminating the phosphor-containing film with light by means of an optical fiber that receives light from a light source and directs it onto the phosphor-containing film so that the film fluoresces light in a pattern corresponding to the diffraction pattern of the sample and the fluoresced light travels back along the optical fiber to an integrating sphere which directs the fluoresced light to a signal processing means where the fluoresced light is received and translated so as to allow detection of the stored image.

29. The method of claim 28 further comprising the step of directing the fluoresced light from the integrating sphere to a photomultiplier which receives the fluoresced light and transmits a signal corresponding to the pattern of the fluoresced light.

30. The method of claim 28 further comprising the step of transmitting the signal from the photomultiplier to a discriminator and a computer so that the diffraction pattern from the sample is detected.

31. The method of claim 28 wherein the illuminating step further comprises moving the optical fiber horizontally and vertically across the phosphor-containing film so as to allow detection of the diffraction pattern snored in the film.

* * * * *